Feb. 18, 1936.  P. C. LEMMERMAN  2,031,494
WELDING ROD COATING
Filed Dec. 19, 1933
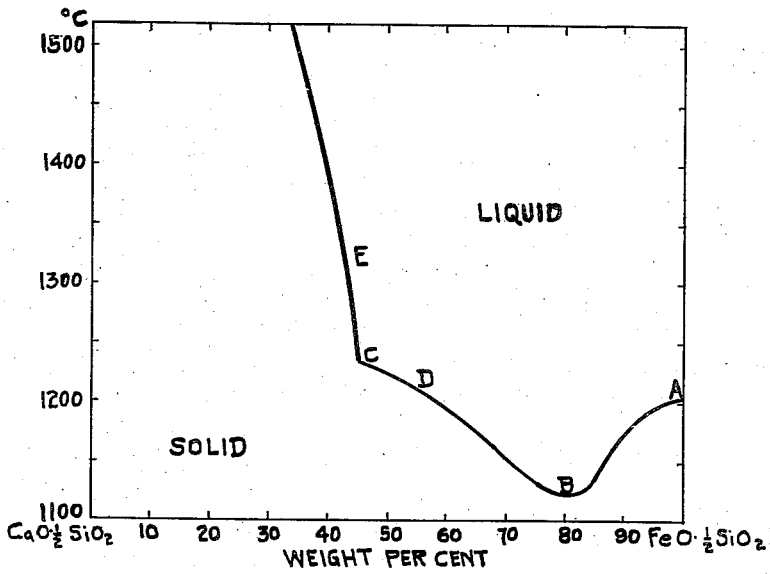
FIG. NO.1.
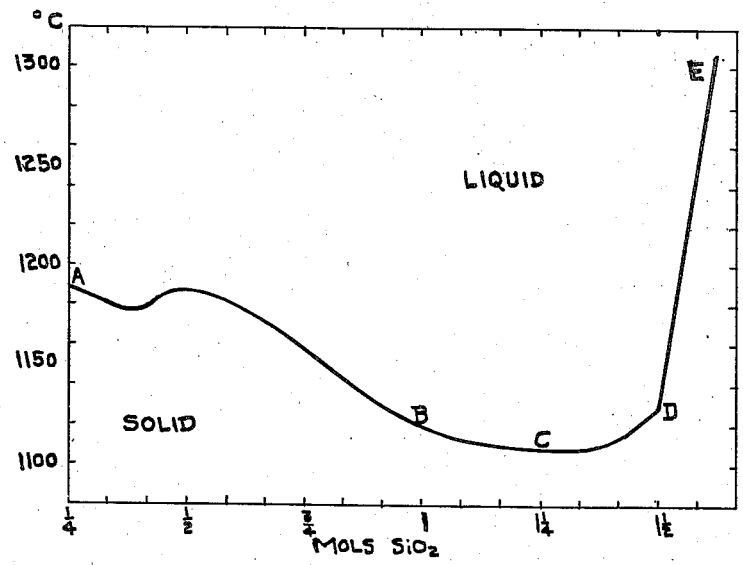
FIG. NO.2.
INVENTOR.
PAUL C. LEMMERMAN
BY
ATTORNEY.

Patented Feb. 18, 1936

2,031,494

UNITED STATES PATENT OFFICE 2,031,494

WELDING ROD COATING

Paul C. Lemmerman, East Cleveland, Ohio, assignor to The Grasselli Chemical Company, Cleveland, Ohio, a corporation of Delaware Application December 19, 1933, Serial No. 703,158

12 Claims. (Cl. 219—8)

This invention relates to the use of compounds of the type $FeO \cdot xMeO \cdot ySiO_2$ in association with electric welding rods wherein they serve both as slagging ingredients and as arc stabilizers. My compounds, hereafter fully described, are characterized by uniformity of composition, substantial freedom from deleterious impurities, and by the property of having a low melting point, not materially above 1300° C.

Late in the nineteenth century it was proposed to use blast furnace slags as welding rod coatings. These slags contain compounds of the type $FeO \cdot xSiO_2$ where $x$ is usually one or more. By reason of the wide variation of their composition these slags have not been found suitable for commercial use. The melting points of different slags vary widely, and are usually too high. Moreover, the quantity of sulfur, phosphorous, and other impurities in these slags is rather large, with the result that when they are used, the welded joint contains phosphorous, sulfur, etc.

In order to obtain even fair results the art has been forced to abandon these $FeO \cdot xSiO_2$ containing materials and to use talc, titanium compounds, mechanical mixtures of iron oxides and silica, etc.

The use of mechanical mixtures of iron oxides and silica proved fairly satisfactory, as sulfur, phosphorous, and other impurities need not be present. However, such mixtures have rather high melting points, and it is very difficult to obtain uniformity among different batches. Moreover, the iron oxides, $Fe_2O_3$ or $Fe_3O_4$, must be reduced before a fused material can be obtained. Such a reduction uses up the organic reducing agents and the ferromanganese, usually provided in the welding rod coating for other purposes. Another difficulty which has been experienced is that under ordinary welding conditions the high temperatures required to fuse the iron oxide-silica mixture are not maintained long enough for the fusion to be complete, or for the gaseous products to be driven off from the molten weld metal and from the slag.

It is customary to add such materials as calcium and barium carbonates, hydroxides, and fluorides to the welding rod coatings to promote arc conductivity. These materials are probably partially volatilized at the arc temperatures. The volatilized material lowers the resistance of the air gap to the low voltage, high amperage current. The addition of these arc stabilizing materials has involved many difficulties. For one, they tend to react with the silicate binder usually used in welding rod coatings. Also, since under ordinary welding conditions the required high temperatures are not long maintained, the gases formed by their decomposition may not be entirely removed from the weld metal and from the slag.

I have found that a compound of the type $FeO \cdot xCaO \cdot ySiO_2$ is very desirable as a slag forming ingredient, and at the same time acts as an arc stabilizer.

My novel slag forming materials are manufactured products of uniform composition and low, definite melting point, and are relatively free from impurities such as a sulfur, phosphorous, etc.

The melting points of my preferred materials are lower than that of any composition of the type $FeO \cdot xSiO_2$. Due to their low melting points my materials remain very fluid until the weld metal solidifies. So, the slag solidifies on the surface of the weld metal instead of being occluded therein. It is very brittle and is easily removed from the weld.

Unlike mechanical mixtures of iron oxide, silica and arc stabilizing materials, my compounds do not destroy the efficiency of organic reducing agents, ferromanganese, and silicates present in the welding rod coating.

In the attached drawing:

Figure 1 is a phase rule diagram of the system $CaO \cdot \frac{1}{2}SiO_2$—$FeO \cdot \frac{1}{2}SiO_2$.

Figure 2 is a diagram showing the melting points of the system $FeO \cdot \frac{1}{2}CaO \cdot n$ mols $SiO_2$.

One of my preferred compositions is $$FeO \cdot \frac{1}{2}CaO \cdot 1\frac{1}{4}SiO_2$$

which has a melting point of about 1110° C.

For purposes of illustration I shall outline a process for the manufacture of this compound. I intimately mixed one mol of iron oxide, one-half mol of lime, one and one-fourth mols of silica, and carbon. The mixture was turned into a graphite crucible and the crucible placed in an induction type electric furnace. The mixture was then fused at about 1540° C.

In order more clearly to understand the limits of my invention reference should be had to the accompanying diagrams.

As seen in Figure 1, starting with a composition A ($FeO \cdot \frac{1}{2}SiO_2$) and adding lime, the melting point drops to about 1120° C. at the point B which represents a material of approximately the composition $FeO \cdot \frac{1}{5}CaO \cdot \frac{3}{5}SiO_2$. With a further addition of lime the melting point increases to about 1220° C. at the point D which corresponds to a material of approximately the composition $FeO \cdot CaO \cdot SiO_2$. With a still further addition of lime the melting point increases to slightly over 1300° C. at point E which corresponds to a material of approximately the composition $$FeO \cdot 1\tfrac{1}{5}CaO \cdot SiO_2.$$

This composition E represents about my upper limit on CaO. In general, for each mol of FeO I may use no more than about $1\tfrac{1}{5}$ mols of CaO, and I prefer to use no more than about 1 mol of CaO. I prefer to use at least some CaO because of its effect as an arc stabilizer, and because of its effect of decreasing the melting point of the compound.

The effect of varying the CaO in the formula $FeO \cdot xCaO \cdot ySiO_2$ has been seen. In Figure 2 is illustrated the effect of varying the $SiO_2$. The diagram of Figure 2 is for the system $FeO \cdot \tfrac{1}{2}CaO \cdot n$ mols $SiO_2$. From the behavior of this typical ratio of FeO to CaO with various amounts of $SiO_2$, I am able to set approximate limits on the $SiO_2$ variation.

In Figure 2 the point A represents a compound $FeO \cdot \tfrac{1}{2}CaO \cdot \tfrac{1}{4}SiO_2$ which has a melting point of about 1190° C. On addition of silica the melting point drops until at point B a melting point of about 1120° C. is reached. The point B represents approximately the composition.

$$FeO \cdot \tfrac{1}{2}CaO \cdot SiO_2.$$

On addition of more $SiO_2$ the melting points drop slightly until point C is reached, about 1110° C. The point C represents approximately the composition $FeO \cdot \tfrac{1}{2}CaO \cdot 1\tfrac{1}{4}SiO_2$. A further addition of silica raises the melting point slowly until at point D a melting point of about 1130° C. is reached. The point D represents the composition $FeO \cdot \tfrac{1}{2}CaO \cdot 1\tfrac{1}{2}SiO_2$. A further increase of $SiO_2$ rapidly raises the melting point until at point E a melting point of about 1300° C. is reached. The point E represents approximately the composition $FeO \cdot \tfrac{1}{2}CaO \cdot 1\tfrac{3}{5}SiO_2$. In general, I may use for each mol of FeO, between about $\tfrac{1}{4}$ and $1\tfrac{3}{5}$ mols of $SiO_2$. I prefer to use between from about 1 to $1\tfrac{1}{2}$ mols of $SiO_2$.

The melting point of my preferred compounds is in no case substantially above 1300° C. The formulae composition of my iron calcium silicates, above disclosed, may be represented as:

$$FeO \cdot xCaO \cdot ySiO_2$$

where $x$ is less than about $1\tfrac{1}{5}$ and $y$ is between about $\tfrac{1}{4}$ and $1\tfrac{3}{5}$.

While I have discussed my compounds with reference to calcium, I do not intend to be limited thereto. Instead of calcium I may use barium in the heretofore described compounds. The type formula of my novel welding rod coating compounds may be represented as follows:

$$FeO \cdot xMeO \cdot ySiO_2$$

where Me represents calcium or barium, and $x$ and $y$ represent the number of mols of MeO and $SiO_2$ respectively.

In electric welding the welding rod should be provided with a suitable coating. Of course, the coating material may be put in the center of the rod as a core, etc., and when I refer to a "coating" herein I mean to include such equivalent manners of association.

An efficient coating should contain: an organic reducing material, such as a cellulosic material, which burns in the arc to form a gaseous envelope that keeps atmospheric oxygen and nitrogen from the molten metal; ferromanganese which acts to deoxidize and increase the fluidity of the molten metal and to prevent the occlusion of FeO therein; iron calcium silicates, according to my invention, which function as heretofore disclosed; and a binder such as sodium or potassium silicate solutions.

The following examples illustrate typical welding rod coating compositions including the novel compounds of my invention:

*Example 1*

|  | Percent |
|---|---|
| Wood flour | 30 |
| Ferromanganese | 10 |
| $FeO \cdot \tfrac{1}{2}CaO \cdot 1\tfrac{1}{4}SiO_2$  | 45 |
| Sodium silicate | 15 |

This mixture may be applied as a coating to welding rods, or as a core, etc.

*Example 2*

|  | Percent |
|---|---|
| Cotton Fiber | 50 |
| Ferromanganese | 10 |
| $FeO \cdot \tfrac{1}{2}CaO \cdot \tfrac{3}{5}SiO_2$  | 25 |
| Potassium silicate | 15 |

This mixture may be applied as a coating to welding rods, or as a core, etc.

Welding rods coated with a composition including my slagging and stabilizing compound constitute a novel product of my invention.

Welding rods associated with the composition of my invention are used in welding processes in the same way as those hitherto known to the art.

I claim:

1. A composition for use in association with welding rods comprising a system of the formula $$FeO \cdot xMeO \cdot ySiO_2$$

where $x$ and $y$ represent the number of mols present, and where Me represents calcium or barium, the compound having a melting point not substantially higher than 1300° C.

2. A composition for use in association with welding rods comprising a system of the formula $$FeO \cdot xCaO \cdot ySiO_2$$

where $x$ and $y$ represent the number of mols present, the compound having a melting point not substantially higher than 1300° C.

3. A composition for coating welding rods comprising $$FeO \cdot xMeO \cdot ySiO_2$$

where Me represents calcium or barium and where $x$ is no more than about $1\tfrac{1}{5}$ and $y$ is between about $\tfrac{1}{4}$ and $1\tfrac{3}{5}$.

4. A composition for coating welding rods comprising $$FeO \cdot xCaO \cdot ySiO_2$$

where $x$ is no more than about $1\tfrac{1}{5}$ and $y$ is between about $\tfrac{1}{4}$ and $1\tfrac{3}{5}$.

5. A composition for coating welding rods comprising $$FeO \cdot xMeO \cdot ySiO_2$$

where Me represents calcium or barium and where $x$ is no more than about 1 and $y$ is between about 1 and $1\tfrac{1}{2}$.

6. A composition for coating welding rods comprising $$FeO \cdot xCaO \cdot ySiO_2$$

where $x$ is no more than about 1 and $y$ is between about 1 and 1½.

7. A composition for coating welding rods comprising $$FeO \cdot xCaO \cdot ySiO_2$$

where $x$ is about ½ and $y$ is about 1¼.

8. A composition for coating welding rods comprising $$FeO \cdot xCaO \cdot ySiO_2$$

where $x$ is about ⅕ and $y$ is about ⅗.

9. A composition for coating welding rods comprising compounds of the formula $$FeO \cdot xMeO \cdot ySiO_2$$

where Me represents calcium or barium and $x$ and $y$ represent the number of mols present, the compounds being of substantially uniform composition, being substantially free from deleterious impurities, and having a melting point not substantially higher than 1300° C.

10. As an article of manufacture a welding rod coated with a composition comprising $$FeO \cdot xMeO \cdot ySiO_2$$

where Me represents calcium or barium and $x$ and $y$ represent the number of mols present, the compound having a melting point not substantially higher than 1300° C.

11. A welding rod which has associated therewith a composition comprising:

$$FeO \cdot xMeO \cdot ySiO_2$$

where Me represents calcium or barium and where $x$ is no more than about 1 1/10 and $y$ is between about ¼ and 1⅗.

12. A welding rod which has associated therewith a composition comprising:

$$FeO \cdot xCaO \cdot ySiO_2$$

wherein $x$ is no more than about 1 and $y$ is between about 1 and 1½.

PAUL C. LEMMERMAN.